(12) United States Patent
Miyaguchi

(10) Patent No.: US 7,138,637 B2
(45) Date of Patent: Nov. 21, 2006

(54) X-RAY IMAGER

(75) Inventor: Kazuhisa Miyaguchi, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 190 days.

(21) Appl. No.: 10/485,301

(22) PCT Filed: Jul. 31, 2002

(86) PCT No.: PCT/JP02/07810

§ 371 (c)(1),
(2), (4) Date: Jan. 30, 2004

(87) PCT Pub. No.: WO03/012477

PCT Pub. Date: Feb. 13, 2003

(65) Prior Publication Data

US 2004/0173754 A1  Sep. 9, 2004

(30) Foreign Application Priority Data

Aug. 1, 2001  (JP) ............................. 2001-234030

(51) Int. Cl.
*G01T 1/20* (2006.01)
(52) U.S. Cl. .................................. 250/370.11
(58) Field of Classification Search ........... 250/370.11, 250/370.12; 378/98.8, 108, 146
See application file for complete search history.

(56) References Cited

U.S. PATENT DOCUMENTS 4,383,327 A  5/1983  Kruger
5,664,001 A *  9/1997  Tachibana et al. ......... 378/98.8

FOREIGN PATENT DOCUMENTS

EP  1 102 326  5/2001
JP  06-045576  2/1994
JP  10-012851  1/1998
JP  10-282243  10/1998
JP  11-027589  1/1999
JP  2001-078099  3/2001
JP  2001-119010  4/2001

OTHER PUBLICATIONS

Allen, "Application of CCDs to Digital X-Ray Mammography", SPIE, vol. 2163 Physics of Medical Imaging, (1994), pp. 264-273.
Barbe, "Time Delay and Integration Image Sensors", Solid State Imaging the Netherlands, (1976), pp. 659-671.
Roehrig et al., "Real-time Imaging Detectors For Portal Imaging", SPIE, vol. 2009, X-Ray Detector Physics and Applications II, (1993), pp. 144-167.
Toker et al., "Design and Development of a Fiber Optic TDI CCD-based Slot-Scan Digital Mammography System", SPIE vol. 2009, X-Ray Detector Physics and Applications II, (1993), pp. 246-252.
Speller et al., "Current Status and Requirements for Position-Sensitive Detectors in Medicine", Nuclear Instruments and Methods in Physics Research A, vol. 477, (2002), pp. 469-474.

* cited by examiner

*Primary Examiner*—Otilia Gabor
(74) *Attorney, Agent, or Firm*—Drinker Biddle & Reath LLP

(57) ABSTRACT

In a case where X-ray imaging is carried out by using a scintillator (4), a plurality of CCD chips to be driven by means of TDI are arranged, and a horizontal charge compressing vertical shift register row (2c) that is narrow in width is interposed between an imaging region (2vv) and a horizontal shift register (2h), whereby a space is created near the charge transfer direction terminal of the horizontal shift register (2h). By providing an amplifier (7) in this space, an increase in space of the device with respect to the imaging region can be prevented.

4 Claims, 4 Drawing Sheets

X-RAY IMAGER

TECHNICAL FIELD

The present invention relates to an X-ray imaging device constructed by arranging a plurality of CCD chips.

BACKGROUND ART

A conventional X-ray imaging device is described in Japanese Unexamined Patent Publication No. 2001-78099. This X-ray imaging device is constructed by arranging an optical fiber plate (FOP) on a photoelectric conversion region, i.e. an imaging region of each of a plurality of CCD chips and providing a scintillator on each FOP. The scintillator emits fluorescence in response to an X-ray. Fluorescence made incident on each FOP reaches a photodetecting region of the CCD chip through the FOP.

A slight space exists between the CCD chips, however, the plane of incidence of the FOP provided on the CCD chip adjacent to the central CCD chip leans to the side of the central CCD chip, and fluorescence made incident on this plane advances obliquely with respect to the plane of incidence and reaches a corresponding photodetecting region. Namely, although a slight space exists between the photodetecting regions of the CCD chips, almost no space exists between the planes of incidence of the FOP, and these planes of incidence form one continuous plane.

DISCLOSURE OF THE INVENTION

However, in the conventional X-ray imaging device, since the space between the imaging regions is comparatively large, the dimensions of the whole device become large in comparison with the imaging region. The present invention has been made in view of this problem, and an object thereof is to provide an X-ray imaging device having a structure that can suppress an increase in size of the device with respect to the imaging region.

In order to solve the above mentioned problem, the X-ray imaging device relating to the invention equipped with a plurality of full-frame transfer-type CCD chips arranged adjacent to each other along at least one direction so as to image a fluorescent image generated at a scintillator in response to incidence of an X-ray image, is characterized in that each of the CCD chips comprises an imaging region composed of a plurality of vertical shift registers to be TDI-driven, a horizontal shift register that transfers electric charge transferred from the imaging region along said one direction, a horizontal charge compressing vertical shift register row that is continued to the terminal in the charge transfer direction of the imaging region, has the same pixel number along said one direction as that of the imaging region, has a length of the horizontal shift register side being shorter than that of the imaging region, and transfers a charge that has flown-in from the charge transfer direction terminal of the imaging region to the horizontal shift register, an amplifier element that is positioned near the charge transfer direction terminal of the horizontal shift register and connected to this terminal, and a light shield film provided on the horizontal charge compressing vertical shift register row.

By this X-ray imaging device, a fluorescent image is converted into a charge image (electronic image) within the imaging region by being made incident on the imaging region. The vertical shift registers forming the imaging region are TDI-driven, so that the charge image is moved in synchronization with movement of an imaging object by the vertical shift registers, and electric charge generated in accordance with a specified point of the imaging object is integrated with time.

After the charge image passes through the charge transfer direction terminal of the imaging region, the charge image is transferred to the horizontal charge compressing vertical shift register row in order, and spatially compressed along the horizontal direction. This compressed charge image is transferred to the horizontal shift registers in order, and the charge image having a spatial distribution is converted by the horizontal shift registers into a charge image having a temporal distribution, and then time-series is transferred as a video signal along the horizontal direction (one direction). Since an amplifier is provided near the charge transfer direction terminal of the horizontal shift register, this video signal is amplified and outputted externally.

Herein, the pixel number of the horizontal charge compressing vertical shift register row along the horizontal direction is equal to that of the imaging region, so that the pixel information is transferred to the horizontal shift register without being reduced, however, since the length of the horizontal shift register side of the horizontal charge compressing vertical shift register row is shorter than that of the imaging region, the charge transfer direction terminal of the horizontal shift register is positioned at the inner side more than the horizontal end of the imaging region, and a space exists at the outside of the charge transfer direction terminal of the horizontal shift register. The amplifier is positioned near the charge transfer direction terminal of the horizontal shift register, so that at least a part of this amplifier is positioned inside this space, and the overall horizontal length of the region in which the horizontal shift register and the amplifier have been formed becomes shorter than a construction different from this construction.

Therefore, in a case where a plurality of CCD chips are arranged adjacent to each other along the horizontal direction, the imaging regions can be made closer to each other than in a construction different from this construction. Particularly, with this construction, since the shortest distance between the horizontal end of the imaging region and the horizontal end of the CCD chip can be set to 100 μm or less, even if the space between the CCD chips is 50 μm, the shortest distance between the imaging regions can be reduced to at least 300 μm, in actuality, 250 μm or less. This distance makes it possible to correct an image by software to a visually imperceptible range. Therefore, in the X-ray imaging device of the invention, the imaging regions can be made closer to each other, an increase in the size of the device with respect to the imageable region can be prevented.

In this X-ray imaging device, TDI drive is employed, so that a charge generated inside the horizontal charge compressing vertical shift register row is added to a charge generated in the imaging region. Since the horizontal length of the horizontal charge compressing vertical shift register row is set to be short as mentioned above, if a charge on the imaging region generated in accordance with a specified point of an imaging object and a charge generated at the horizontal charge compressing vertical shift register row are added, accurate imaging is not possible.

Therefore, in this X-ray imaging device, a light shield film is provided on the horizontal charge compressing vertical shift register row, and in a case where this light shield film is formed from an X-ray impermeable material and provided above the scintillator, it suppresses generation of fluorescence at the scintillator, and when the film is formed from a fluorescence impermeable material and interposed between the scintillator and the horizontal charge compressing vertical shift register row, it suppresses incidence of a fluorescent image onto this shift register row, whereby the construction makes it possible to carry out accurate imaging.

Furthermore, in this X-ray imaging device, an optical fiber plate to be interposed between the imaging region and the scintillator may be further provided, and in this case, a fluorescent image can be guided to the imaging region while lowering in imaging resolution of the fluorescent image emitted from the scintillator is suppressed.

BEST MODE FOR CARRYING OUT THE INVENTION

Hereinafter, an X-ray imaging device relating to an embodiment is described. The same symbols are attached to the same elements, and overlapping description is omitted.

Figure 1:
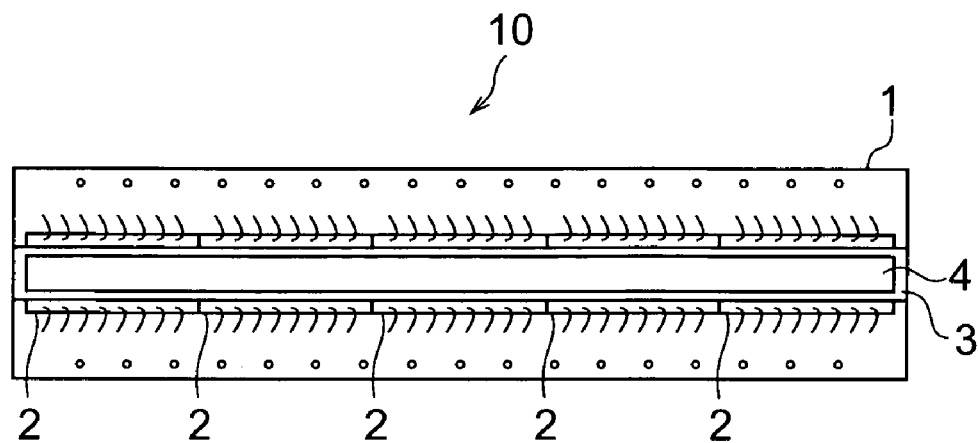
FIG. 1 is a plan view of an X-ray imaging device (imaging sensor) 10.
Figure 2:
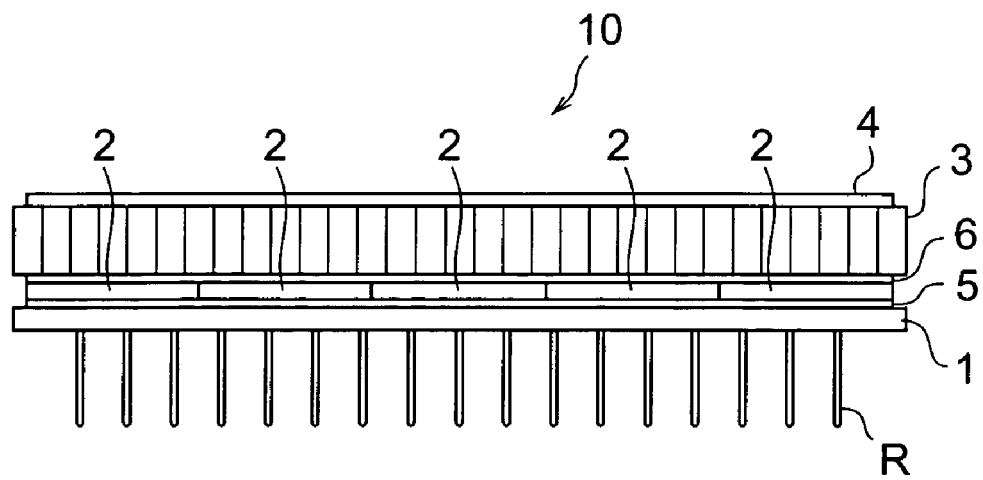
FIG. 2 is a front view of the X-ray imaging device 10.

FIG. 1 is a plan view of the X-ray imaging device (imaging sensor) 10, FIG. 2 is a front view of the X-ray imaging device 10. This X-ray imaging device 10 has a substrate 1 forming the bottom of the package. On the substrate 1, a plurality of CCD chips 2 are placed. On the plurality of CCD chips 2, one optical fiber plate (FOP) 3 is provided so as to be positioned above at least the imaging regions of the CCD chips 2, and on the surface of the FOP 3, a scintillator 4 is provided. Between the substrate 1 and the CCD chips 2 and between the CCD chips 2 and the FOP 3, adhesive resins 5 and 6 are interposed. Furthermore, various bonding wires externally extending from the CCD chips 2 are also covered by the resins and protected from mechanical breakage due to contact with the FOP 3.

When an X-ray is made incident on the scintillator 4, fluorescence is generated at the scintillator 4. The FOP 3 has an optical axis perpendicular to the surfaces of the CCD chips 2, and it optically couples the imaging regions of the CCD chips 2 with the scintillator 4. Therefore, fluorescence generated at the scintillator 4 passes through the FOP 3 and reaches the imaging regions of the CCD chips 2. Images acquired in the imaging regions are outputted externally as video signals via lead pins R provided at the lower part of the package.

Furthermore, the plurality of CCD chips 2 are arranged adjacent to each other along at least one direction (horizontal direction) so as to get a fluorescent image generated at the scintillator 4 in response to incidence of an X-ray image.

Figure 3:
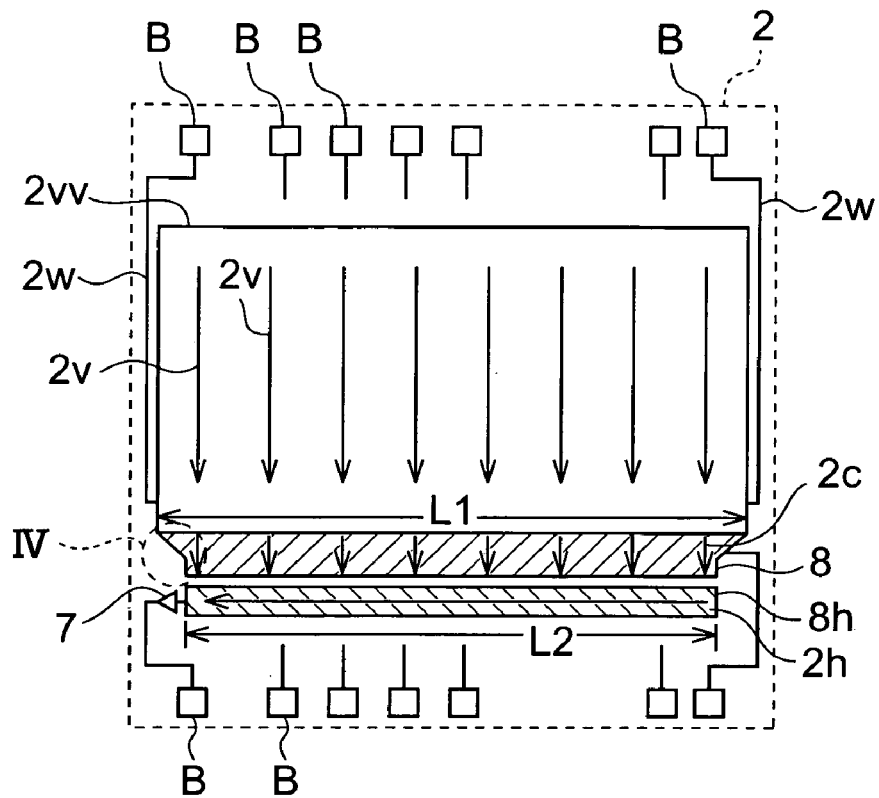
FIG. 3 is a plan view of one CCD chip 2.

FIG. 3 is a plan view of one CCD chip 2. Each of the CCD chips 2 shown in FIG. 1 are the same as FIG. 3. The CCD chip 2 comprises an imaging region 2vv composed of a plurality of shift registers 2v to be driven by means of TDI (Time Delay Integration) and a horizontal shift register 2h that transfers a charge transferred from the imaging region 2vv along the horizontal direction (- direction). A horizontal charge compressing vertical shift register row 2c is interposed between the imaging 2vv and the horizontal shift register 2h.

Furthermore, in the description given below, unless otherwise noted, the horizontal direction means the direction of adjacent the CCD chips 2 and is the lengthwise direction of the horizontal shift register 2h, and the vertical direction is the lengthwise direction of the vertical shift register 2v.

The plurality of vertical shift registers forming the imaging region 2vv are CCDs, pixels that execute this imaging also contribute to charge transfer, and a charge generated by exposure of a specific pixel is transferred to a pixel positioned on the next line, and added to a charge generated due to exposure of this next line pixel. The CCD chips 2 have no strage part different from the imaging region, and function as full-frame transfer type CCD chips.

Generally, a full-frame transfer type CCD has an integration period (exposure) and a transfer period. It acquires an object image during the integration period, and then closes a shutter, and thereafter, transfers signals vertically for each pixel row (one row) in the horizontal direction.

On the other hand, a frame transfer type CCD has an imaging region and an storage region, so that it acquires an object image in the imaging region during an integration period, transfers the object image to the storage region for each one frame, and transfers signals vertically for each pixel row (one row) in the horizontal direction. In TDI drive employed in the present invention, vertical transfer is carried out for each pixel row (one row) in the horizontal direction in synchronization with movement of the object, so that it is necessary that the full-frame transfer type that carries out pixel transfer for each row is used for this drive. Furthermore, TDI operation with the full-frame transfer type is realized by provision of only one horizontal row of horizontal charge compressing vertical shift register, and therefore, space saving can be realized.

The horizontal charge compressing vertical shift register row 2c is continued to the charge transfer direction terminal of the imaging region 2vv and has the same pixel number along the horizontal direction as that of the imaging region 2vv, and has a length L2 at the horizontal shift register side shorter than the horizontal length L1 of the imaging region 2vv, and transfers a charge that has flown-in from the charge transfer direction terminal of the imaging region 2vv to the horizontal shift register 2h while spatially compressing it. Furthermore, the amplifier 7 is positioned near the charge transfer direction terminal of the horizontal shift register 2h, and is connected to this terminal. The amplifier 7 is a charge sensitive amplifier for converting charge (electron) into a voltage, and is constructed by source follower connection of MOSFET in general, that is, for example, a floating diffusion amplifier. Furthermore, on the horizontal charge compressing vertical shift register row 2c and the horizontal shift register 2h, light shield films 8 and 8h are provided.

Figure 4:
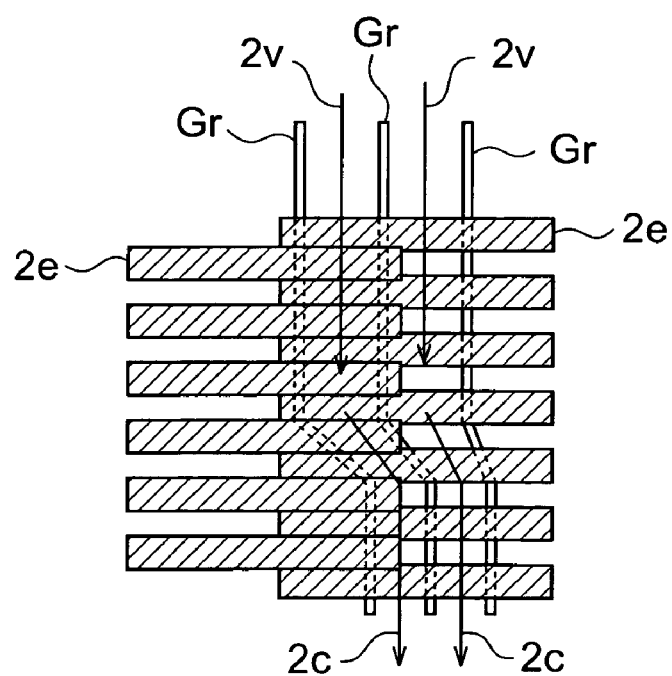
FIG. 4 is a partially enlarged view of a region IV in which a plurality of vertical shift registers 2v and horizontal charge compressing vertical shift register rows 2c, shown in FIG. 3, are formed.

FIG. 4 is a partially enlarged view of region IV in which a plurality of vertical shift registers 2v and horizontal charge compressing vertical shift register row 2c, shown in FIG. 3, are formed. The vertical shift registers 2v are isolated from each other by isolating regions Gr formed of semiconductor regions in which grooves with light shields or insulators embedded and potential barriers with respect to the horizontal adjacent portions can be formed, and to each vertical shift register 2v, each of the horizontal charge compressing vertical shift register row 2c is continued. As a matter of course, the horizontal charge compressing vertical shift registers 2c are also isolated from each other by the isolating regions Gr.

The horizontal pixel number (channel number) of the horizontal charge compressing shift register 2c is equal to that of the vertical shift register 2v, however, the width of each channel is set to be narrower. For example, when the channel width of each vertical shift register 2v is 48 μm, the width of each horizontal charge compressing vertical shift register 2c is set to 44 μm. Furthermore, the vertical pitches between pixels forming these are equal to each other, and the vertical pixel length is set to 48 μm.

Fluorescence generated at the scintillator 4 passes through polysilicon electrodes 2e provided above the vertical shift registers 2v and 2c and is photoelectrically converted in the imaging region, and then accumulated as charge within semiconductor potential wells formed immediately under the polysilicon electrodes 2e. The polysilicon electrodes 2e are transfer electrodes for transferring charge vertically, and extend horizontally.

When a predetermined drive voltage, that is, a two-phase, three-phase, or four-phase drive voltage is applied to the transfer electrodes 2e, the potential wells immediately under the electrodes move vertically, whereby a charge transfer is carried out. The drive voltage is applied to the transfer electrodes 2e via a wiring 2w that is laid outside the horizontal ends of the imaging region 2vv and electrically connected to the transfer electrodes 2e. The wiring 2w is connected to bonding pads B provided at the margins of the CCD chips 2. All bonding pads B are disposed outside the vertical ends of the imaging region 2vv, and are not provided outside the horizontal ends of the imaging region 2vv.

Figure 5:
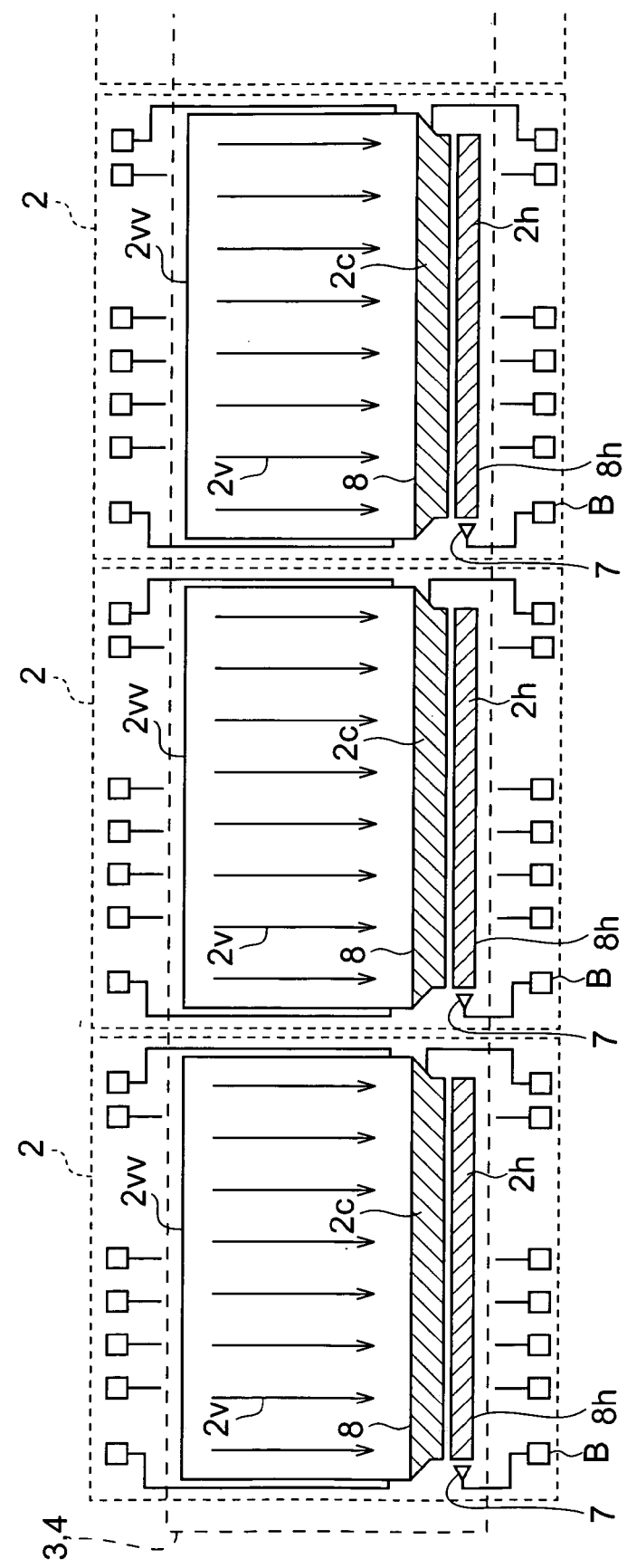
FIG. 5 is a partially enlarged view of the X-ray imaging device 10 shown in FIG. 1.

FIG. 5 is a partially enlarged view of the X-ray imaging device 10 shown in FIG. 1, and shows several CCD chips 2. The direction of arrangement of the plurality of CCD chips 2 coincides with the lengthwise direction of the horizontal shift register 2h.

A fluorescent image generated at the scintillator 4 is converted into a charge image (electronic image) within the imaging region 2vv by being made incident on the imaging region 2vv. Since the vertical shift registers 2v forming the imaging region 2vv is driven by means of TDI, this charge image is moved in synchronization with movement of an imaging object by the vertical shift registers, and a charge generated in accordance with a specified point of the imaging object is integrated with time.

After the charge image passes through the charge transfer direction terminal of the imaging region 2vv, the charge image is transferred to the horizontal charge compressing vertical shift register row 2c in order, and is spatially compressed along the horizontal direction. This compressed charge image is transferred to the horizontal shift registers 2h in order, and the charge image having a spatial distribution is converted into a charge image having a temporal distribution by the horizontal shift registers 2h, and then time-series transferred along the horizontal direction as a video signal. Since an amplifier 7 is provided near the charge transfer direction terminal of the horizontal shift register 2h, this video signal is amplified and outputted externally via the bonding pad B.

The horizontal charge compressing vertical shift register row 2c has the same pixel number along the horizontal direction as that of the imaging 2vv, so that the pixel information is transferred to the horizontal shift registers 2h without reduction, however, the length (L2 of FIG. 3) of the horizontal shift register side of the horizontal charge compressing vertical shift register row 2c is shorter than the horizontal length (L1 of FIG. 3) of the imaging region 2vv, so that the charge transfer direction terminal of the horizontal shift register 2h is positioned at the inner side more than the horizontal end of the imaging region 2vv, and therefore, a space exists outside the charge transfer direction terminal of the horizontal shift register 2h.

Since the amplifier 7 is positioned near the charge transfer direction terminal of the horizontal shift register 2h, at least a part of the amplifier is positioned within said space, and the overall horizontal length of the region in which the horizontal shift register 2h and the amplifier 7 have been formed becomes shorter than in a construction other than this construction.

Therefore, in a case where the plurality of CCD chips 2 are arranged adjacent to each other along the horizontal direction, the imaging regions 2vv can be made closer to each other than in a construction other than this construction. Particularly, with this construction, since the shortest distance between the horizontal end of the imaging region 2vv and the horizontal end of the CCD chip 2 can be set to 100 μm or less, even if the space between the CCD chips 2 is 50 μm, the shortest distance between the imaging regions 2vv can be set to at least 300 μm, in actuality, 250 μm or less. This distance makes it possible to correct an image by software to a visually imperceptible range. Therefore, with the X-ray imaging device of the invention, the imaging regions can be made closer to each other, so that an increase in size of the device with respect to the imaging region can be prevented.

In this X-ray imaging device 10, since TDI drive is employed, unless the light shield film 8 is provided, at the horizontal charge compressing vertical shift register row 2c, a charge generated inside it is added to a charge generated at the imaging region 2vv. Since the horizontal length of the horizontal charge compressing vertical shift register row 2c is set to be short as mentioned above, if the charge inside the imaging region 2vv generated in accordance with a specified point of an imaging object and the charge generated at the horizontal charge compressing vertical shift register row 2c are added, accurate imaging is not possible.

Therefore, in this X-ray imaging device 10, a light shield film 8 is provided on the horizontal charge compressing vertical shift register row, and when this light shield film 8 is formed from an X-ray impermeable material and provided above the scintillator, it prevents generation of fluorescence at the scintillator, and when the film is formed from a fluorescence impermeable material and interposed between the scintillator and the horizontal charge compressing vertical shift register row, it prevents incidence of a fluorescent image onto this shift register row so as to make accurate imaging possible. Furthermore, the light shield film 8h is also positioned above the horizontal shift register 2h, whereby occurrence of noise due to light incidence is suppressed.

This X-ray imaging device 10 further comprises an FOP 3 interposed between the imaging region 2vv and the scintillator 4, and it is possible to guide a fluorescent image emitted from the scintillator 4 to the imaging region 2vv while suppressing lowering in imaging resolution of this fluorescent image, however, it is also possible that the scintillator 4 is directly provided on the imaging region 2vv without using the FOP 3.

Figure 6:
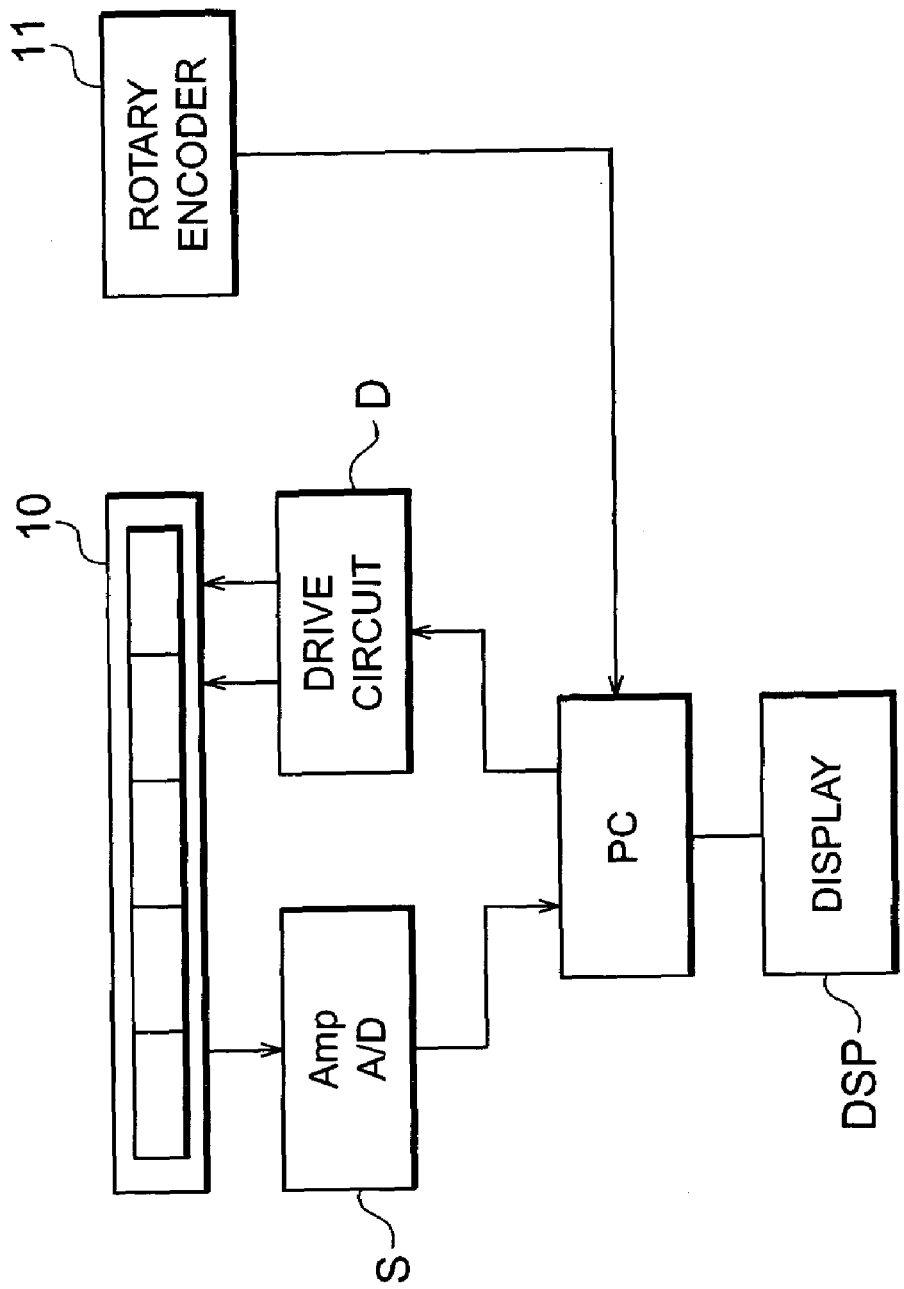
FIG. 6 is a block diagram of an X-ray imaging system using the above mentioned X-ray imaging device 10.

FIG. 6 is a block diagram of an X-ray imaging system using the above mentioned X-ray imaging device 10. When an unillustrated measuring object moves on a belt conveyor, a rotary encoder 11 rotates and the moving velocity v of the measuring object is inputted into a computer PC. When the measuring object is irradiated with an X-ray, an X-ray transmission image is projected onto the X-ray imaging device 10 and moves at the moving velocity v. The vertical shift register 2v carries out vertical charge transfer at the same velocity as this moving velocity v, that is, so that the frequency of the drive voltage becomes a vertical transfer frequency f. The condition of moving velocity v=vertical transfer frequency f×pixel size d is satisfied. Charge accumulated in one pixel is transferred to the next-stage pixel after a period of time (1/f) elapses, and charge generated in accordance with the same point of the measuring object is accumulated in this pixel, and thereafter, the same accumulation operation is repeated.

Furthermore, the drive voltage is supplied from a drive circuit D that can change the vertical transfer frequency f in response to an external input to the X-ray imaging device 10. The vertical transfer frequency f is calculated by the computer PC on the basis of the moving velocity v, and the computer PC controls the drive circuit D so as to output the drive voltage of the vertical transfer frequency f, whereby TDI drive is carried out.

A video signal outputted from the X-ray imaging device 10 is inputted into the computer PC via a signal processing circuit S including an amplifier and an A/D converter, and an X-ray transmission image of an measuring object obtained based on the video signal is displayed on a display DSP. The video signal can also be written on a frame memory in the computer PC.

The above mentioned X-ray imaging device 10 can also be made to function as a high-accuracy one-dimensional sensor by means of TDI drive.

As described above, by the X-ray imaging device of the invention, an increase in size of the device with respect to the imaging region can be prevented.

INDUSTRIAL APPLICABILITY

The present invention is applicable to an X-ray imaging device constructed by arranging a plurality of CCD chips.

The invention claimed is:

1. An X-ray imaging device having a plurality of full-frame transfer type CCD chips aligned in a horizontal direction and being arranged adjacent to each other, wherein each of said CCD chips comprises:

an imaging region formed of a plurality of vertical shift registers to be driven by means of TDI;

a horizontal shift register which transfers a charge that has been transferred from said imaging region along said horizontal direction;

a horizontal charge compressing vertical shift register row which is continued to a charge transfer direction terminal of said imaging region, has the same pixel number along said horizontal direction as that of the imaging region, has a length at the side of said horizontal shift register being shorter than that of the imaging region, and transfers a charge that has flown-in from the charge transfer direction terminal of said imaging region to said horizontal shift register;

an amplifier positioned near the charge transfer direction terminal of said horizontal shift register and connected to this terminal, said amplifier being arranged in a region between this terminal and a horizontal shift resistor of a neighboring CCD chip;

a light shield film provided on said horizontal charge compressing vertical shift register row; and a plurality of bonding pads disposed outside the vertical ends of said imaging region, connected to said amplifier and transfer electrodes formed on said imaging region.

2. The X-ray imaging device according to claim 1, further comprising an optical fiber plate interposed between said imaging region and a scintillator.

3. The X-ray imaging device according to claim 1, further comprising a scintillator arranged over said CCD chips.

4. The X-ray imaging device according to claim 1, wherein said vertical shift registers are isolated from each other by isolating regions formed of semiconductor regions in which grooves with light shields or insulators are embedded.

* * * * *